(12) United States Patent
Li et al.

(10) Patent No.: US 8,103,711 B1
(45) Date of Patent: Jan. 24, 2012

(54) DISPERSION COMPENSATION USING DIGITAL INFINITE IMPULSE RESPONSE FILTERING

(75) Inventors: Guifang Li, Oviedo, FL (US); Gilad Goldfarb, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 973 days.

(21) Appl. No.: 12/056,008

(22) Filed: Mar. 26, 2008

Related U.S. Application Data

(60) Provisional application No. 61/031,852, filed on Feb. 27, 2008.

(51) Int. Cl.
*G06F 17/10* (2006.01)

(52) U.S. Cl. ........................................ 708/300; 708/400

(58) Field of Classification Search ........................ None
See application file for complete search history.

(56) References Cited

U.S. PATENT DOCUMENTS

| | | | | |
|---|---|---|---|---|
| 4,984,188 | A * | 1/1991 | Kato | 708/400 |
| 5,528,311 | A * | 6/1996 | Lee et al. | 348/607 |
| 6,501,579 | B2 | 12/2002 | Li et al. | |
| 7,224,863 | B1 | 5/2007 | Li et al. | |

OTHER PUBLICATIONS

Yan Han, Guifang Li, "Direct detection differential polarization-phase-shift keying based on Jones vector" Optics Express, 2004, 12, (24), pp. 5821-5826.
Gilad Goldfarb, Guifang Li, "Dispersion Compensation of up to 25,200ps/nm Using IIR Filtering?" Optical Society of America, 2007, 3 pages.

* cited by examiner

*Primary Examiner* — Lewis Bullock, Jr.
*Assistant Examiner* — Michael Yaary
(74) *Attorney, Agent, or Firm* — Brian S. Steinberger; Phyllis K. Wood; Law Offices of Brian S. Steinberger, P.A.

(57) ABSTRACT

Methods and systems for novel infinite impulse response filtering system to allow DC using a complex input signal having a real and imaginary part of the complex input signal $y_r$ and $y_i$ to produce a real part of a dispersion-compensated signal $X_r$. The system includes a first filtering circuit for filtering the real part of the input signal $y_r$ to produce a filtered real signal $w1$, a second filtering circuit for filtering and time reversing the imaginary part of an input signal $y_i$ to produce a filtered imaginary signal, and a first output summing device for summing the real and the imaginary filtered signal to produce the real part of a dispersion-compensated signal $X_r$. In an embodiment the filtering is accomplished with time reversing devices and real coefficient infinite impulse filters. In another embodiment, the filtering is accomplished with complex-coefficient infinite impulse filters.

23 Claims, 9 Drawing Sheets

DISPERSION COMPENSATION USING DIGITAL INFINITE IMPULSE RESPONSE FILTERING

This application claims the benefit of priority to U.S. Provisional Patent Application No. 61/031,852 filed on Feb. 27, 2008 and was funded in part by DARPA under contract number DAAD1702C0097.

FIELD OF THE INVENTION

This invention relates to digital signal processing and, in particular, to methods, systems, apparatus and devices for digital infinite impulse response filtering for compensating chromatic dispersion in coherently-detected optical transmission systems with subsequent digital signal processing.

BACKGROUND AND PRIOR ART

High-speed digital signal processing has recently been suggested for use in conjunction with coherent detection to allow demodulation of various modulation formats. One major advantage of using digital signal processing after sampling of the outputs from a phase-diversity receiver is that hardware optical phase locking can be avoided and only digital phase-tracking is needed as described in M. G. Taylor, "Coherent detection method using DSP for demodulation of signal and subsequent equalization of propagation impairments," IEEE Photon. Technol. Lett., vol. 16, pp. 674-676, (February 2004) and R. Noe, "PLL-free synchronous QPSK polarization multiplex/diversity receiver concept with digital I&Q baseband processing," IEEE Photon. Technol. Lett. vol. 17, 887-889, (April 2005).

Digital signal processing algorithms can also be used to mitigate degrading effects of optical fiber such as chromatic dispersion and polarization-mode dispersion. As suggested in J. H. Winters, "Equalization in coherent lightwave systems using a fractionally spaced equalizer," J. Lightwave Technol., vol. 8, pp. 1487-1491, (October 1990), for a symbol rate of T, a T/2 tap delay finite impulse response filter may be used to reverse the effect of first order fiber chromatic dispersion. The number of finite impulse response taps required grows linearly with increasing dispersion. As reported in S. J. Savory, "Digital filters for coherent optical receivers", Optics Express, Vol. 16, Issue 2, pp. 804-817 (January 2008), the number of taps required to compensate for 1000 ps/nm of dispersion (assuming a signal bandwidth of B, and 2 samples per symbol), is $N=0.032B^2$. At long propagation distances the added power consumption required for this task becomes significant. Moreover, a longer finite impulse response filter introduces a longer delay and requires more area on a digital signal processing chip.

Alternatively, an infinite impulse response filter may achieve similar performance with substantially reduced number of operations. This leads to lower power consumption and a smaller device footprint and the use of infinite impulse response filtering for dispersion compensation (DC). In contrast to optical DC which processes bandpass signals, digital finite impulse response or infinite impulse response DC processes baseband signals which is described in C. K. Madsen and J. H. Zhao, Optical Filter Design and Analysis: A Signal Processing Approach, New York: John Wiley & Sons, (1999).

Compared to finite impulse response filtering, infinite impulse response filtering achieves dispersion compensation using a significantly smaller number of taps. Infinite impulse response filtering achieves performance similar to the finite impulse response filtering.

SUMMARY OF THE INVENTION

A primary objective of the invention is to provide methods, apparatus and systems for chromatic dispersion compensation in optical telecommunication systems employing homodyne detection with subsequent digital signal processing.

A secondary objective of the invention is to provide methods, apparatus and systems for digital infinite impulse response filtering for dispersion compensation using a significantly smaller number of taps than used with finite impulse response filtering.

A third objective of the invention is to provide methods, apparatus and systems for digital infinite impulse response filtering for dispersion compensation that achieves performance similar to finite impulse response using a reduced number of operations compared to a finite impulse response filter.

A fourth objective of the invention is to provide methods, apparatus and systems for digital infinite impulse response filtering for dispersion compensation.

A fifth objective of the invention is to provide methods, apparatus and systems for digital infinite impulse response filtering for dispersion compensation that has a smaller footprint and reduced power consumption.

A first preferred embodiment of the invention provides a methods A method for infinite impulse filtering to produce a complex dispersion compensated output signal including the steps of receiving a complex input signal having a real part $y_r$ and an imaginary party $y_i$ filtering the real part of the complex input signal $y_r$ to produce an output signal $w_1$, filtering the imaginary part of the complex input signal $y_i$ to produce an output signal $w_2$, and summing the output signal $w_1$ and output signal $w_2$ to produce a real part of a dispersion-compensated signal $X_r$.

For the second embodiment, the novel infinite impulse response filtering system to allow DC using a complex input signal having a real and imaginary part of the complex input signal $y_r$ and $y_i$ to produce a real part of a dispersion-compensated signal $X_r$. The system includes a first filtering circuit for filtering the real part of the input signal $y_r$ to produce a filtered real signal w1, a second filtering circuit for filtering and time reversing the imaginary part of an input signal $y_i$ to produce a filtered imaginary signal, and a first output summing device for summing the real and the imaginary filtered signal to produce the real part of a dispersion-compensated signal $X_r$.

The second filtering circuit includes a first Hilbert transformer $H_{hilb}$ for receiving and filtering the input signal $y_i$, a first summing device for summing the input signal $y_r$ with the filtered input signal $y_i$ from the Hilbert transformer to produce a real signal $z_2$, a first time reversal device connected with an output of the second summing device for time reversing the signal $z_2$; this time-reversal device operates as a first-in-last-out stack where the first stored sample is the last to be fed into the subsequent infinite-impulse-response filter, a first real-coefficients infinite impulse response filter connected with the output of the first time reversal device to filter the signal from the first time-reversal device, and a second time reversal device connected to an output of the real-coefficients infinite impulse response filter to produce the signal $w_2$. The first filtering circuit includes a second summing device for subtracting the input signal $y_r$ from the filtered input signal $y_i$ from the first Hilbert transformer output to produce a real signal $z_1$ and a second real-coefficients infinite impulse response filter for receiving and filtering signal $z_1$ to produce the real signal $w_1$.

In an embodiment, the system also includes a third filtering circuit for filtering a real part of an input signal $y_r$ to produce a filtered real signal $w_2$, a fourth filtering circuit for filtering and time reversing an imaginary part of an input signal $y_i$ to produce a filtered imaginary signal and a second output summing device for summing the real and the imaginary filtered signals $w_1$ and $w_2$ to produce the imaginary part of the dispersion-compensated signal $x_i$ after dividing by 2. The fourth filtering circuit includes a second Hilbert transformer $H_{hilb}$ for receiving and filtering the input signal $y_r$, a third summing device for subtracting the filtered input signal $y_r$ from the Hilbert transformer from the input signal $y_i$ to produce a real signal $z_1$, a third time reversal device connected with an output of the third summing device for time reversing the signal $z_1$, the time-reversal device operating as a first-in-last-out stack, a third infinite impulse response filter connected with the output of the third time reversal device to filter the signal from the third time-reversal device where a first stored sample is last to be fed into the third infinite-impulse-response filter, and a fourth time reversal device connected to an output of the infinite impulse response filter to produce the signal $w_1$. The third filtering circuit includes a fourth summing device for summing the input signal $y_i$ with the filtered input signal $y_r$ from the second Hilbert transformer output to produce signal $z_2$ and a fourth real-coefficients infinite impulse response filter for receiving and filtering of signal $z_2$ to produce the real signal $w_2$.

In an alternative embodiment, the second filtering circuit includes a first Hilbert transformer $H_{hilb}$ for receiving and filtering the input signal $y_i$; a first summing device for summing the input signal $y_r$ with the filtered input signal $y_i$ from the Hilbert transformer to produce a real signal $z_2$; and a first complex-coefficients infinite impulse response filter connected with the output of the first summing device to filter the signal from the first summing device to produce the signal $w_2$. The first filtering circuit alternatively includes a second summing device for subtracting the input signal $y_r$ from the filtered input signal $y_i$ from the first Hilbert transformer output to produce a real signal $z_1$; and a second complex-coefficients infinite impulse response filter for receiving and filtering signal $z_i$ to produce the real signal $w_1$.

Further objects and advantages of this invention will be apparent from the following detailed description of preferred embodiments which are illustrated schematically in the accompanying drawings.

DESCRIPTION OF THE PREFERRED EMBODIMENTS

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

Figure 1:
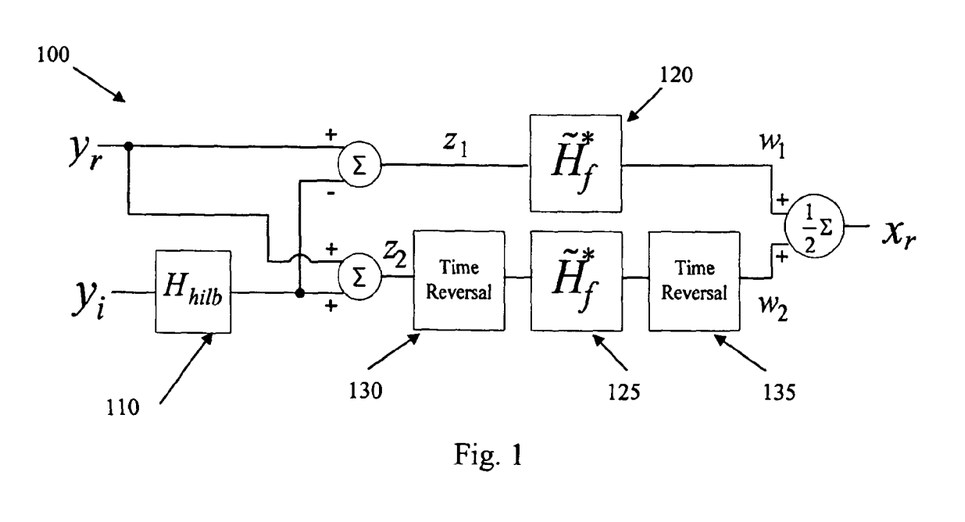
FIG. 1 is a schematic block diagram of an example of a filtering system to allow DC using the real and imaginary parts of the received signal to produce the real part of a transmitted signal.

The following is a list of the reference numbers used in the drawings and the detailed specification to identify components:
100 filtering system
110 Hilbert transformer
120 IIR filter
125 IIR filter
130 time reversal device
135 time reversal device Infinite impulse response (IIR) is a property of signal processing systems. Systems with that property are known as infinite impulse response systems or when dealing with electronic filter systems as infinite impulse response filters. They have an impulse response function which may be non-zero over an infinite length of time. This is in contrast to finite impulse response filters which have fixed-duration impulse responses.

The effect of dispersion may be modeled as a linear filtering process given by:

$$y_r + j \cdot y_i = (x_r + j \cdot x_i) \otimes (hf_r + j \cdot hf_i) = x_r \otimes hf_r - x_i \otimes hf_i + j(x_r \otimes hf_i + x_i \otimes hf_r) \quad (1)$$

where y, x and hf are the received signals, transmitted signals and the fiber impulse response, respectively and $\otimes$ denotes convolution. Subscripts r and i designate the real and imaginary parts for each term. The all-pass transfer function of a standard single-mode fiber (SSMF) is:

$$H_f(\omega) = \exp\{j \cdot \lambda_0^2 \cdot D \cdot z \cdot \omega^2 / (4\pi c)\} \quad (2)$$

where $\omega$, $\lambda_0$, D and z are baseband radial frequency, transmitter and local oscillator wavelength, fiber dispersion parameter at wavelength $\lambda_0$, and the propagation distance, respectively. It can be readily shown that $hf_r = \mathscr{F}^{-1}\{H_{f_r}\}$ and $hf_i = \mathscr{F}^{-1}\{H_{f_i}\}$ where $H_{f_r}$ and $H_{f_i}$ are the real and imaginary parts of Equation (2), respectively. Fourier transform of Equation (1) yields $X(\omega) = Y(\omega) \cdot H^*_f(\omega)$ where an asterisk denotes complex conjugation. By separating into real and imaginary parts it is obtained that:

$$\begin{bmatrix} X_r \\ X_i \end{bmatrix} = M \cdot \begin{bmatrix} Y_r \\ Y_i \end{bmatrix}, M = \begin{bmatrix} H_{fr} & H_{fi} \\ -H_{fi} & H_{fr} \end{bmatrix} \quad (3)$$

where $X_r$, $Y_r$ and $X_i$, $Y_i$ are the Fourier transforms of the real and imaginary parts of the transmitted and received signals, respectively.

It is necessary then to express matrix M in Equation (3) using monotonous phase response functions only. Defining $\tilde{H}f = H_{f_c} \cdot H_{hilb} \cdot H_{f_i}$ where $H_{hilb} = -j \cdot \text{sign}(\omega)$ is the transfer function of the Hilbert transform, matrix M is rewritten as:

$$M = \frac{1}{2}\begin{bmatrix} \tilde{H}_f + \tilde{H}_f^* & H_{hilb}(\tilde{H}_f - \tilde{H}_f^*) \\ H_{hilb}(\tilde{H}_f^* - \tilde{H}_f) & \tilde{H}_f + \tilde{H}_f^* \end{bmatrix} \quad (4)$$

In a standard single-mode fiber at $\lambda_0 = 1550_{nm}$, $D > 0$ ps/km/nm. This implies that the phase response of $\tilde{H}_f$ increases monotonously, and the response of $\tilde{H}_f^*$ monotonously decreases. Hence, the group delay of $\tilde{H}_f^*$ defined as $$GD(\omega) = -\frac{\partial}{\partial \omega}\arg\{\tilde{H}_f^*(\omega)\},$$

is always positive, making $\tilde{H}_f^*$ causal. A real-coefficient IIR filter having response matching, as much as possible, to $\tilde{H}_f^*$ is designed using several methods described in C. C. Tseng, "Design of IIR digital all-pass filters using least $p^{th}$ phase error criterion," IEEE Trans. On Circuits and Systems-II: Analog and Digital Signal Processing, vol. 50, 653-656, September 2003. The infinite impulse response filter's order N is chosen using the following argument. Each order of the infinite impulse response filter contributes a $\pi$ phase shift in the infinite impulse response filter phase response. At the band edge, half the sampling rate, a total phase of $N \cdot \pi$ radians is accumulated. To allow DC, the required sampling rate is $2 \cdot B_r$, where $B_r$ is the symbol rate. To find the filter order that best matches a given dispersion, Equation (2) is used where the phase at the band edge is considered ($\omega = 2\pi B_r$):

$$N = \text{round}(\lambda_0^2 \cdot D \cdot z \cdot B_r^2 / c) \quad (5)$$

where $\lambda_0$, D and z, $B_r$, c are the transmitter (and local oscillator, LO) wavelength, fiber dispersion parameter at wavelength $\lambda_0$, the propagation distance, symbol rate and speed of light in vacuum, respectively. Using Equation (5), every additional filter order (i.e., 2 taps) compensates for approximately 78 km using D=16 ps/km/nm, $B_r$=10 GHz of standard single-mode fiber transmission.

The filter $\tilde{H}_f$ having an inverse phase response compared to $\tilde{H}_f^*$ is non-causal and unstable. Therefore, it is necessary to implement an equivalent filtering process to $\tilde{H}_f$ using $\tilde{H}_f^*$. By inserting Equation (4) instead of M in Equation (3), the Fourier Transform of the real part of the transmitted signal is given by:

$$X_r = \tilde{H}_f^*(Y_r - H_{hilb}Y_i)/2 + \tilde{H}_f(Y_r + H_{hilb}Y_i)/2 \quad (6)$$

Figure 2:
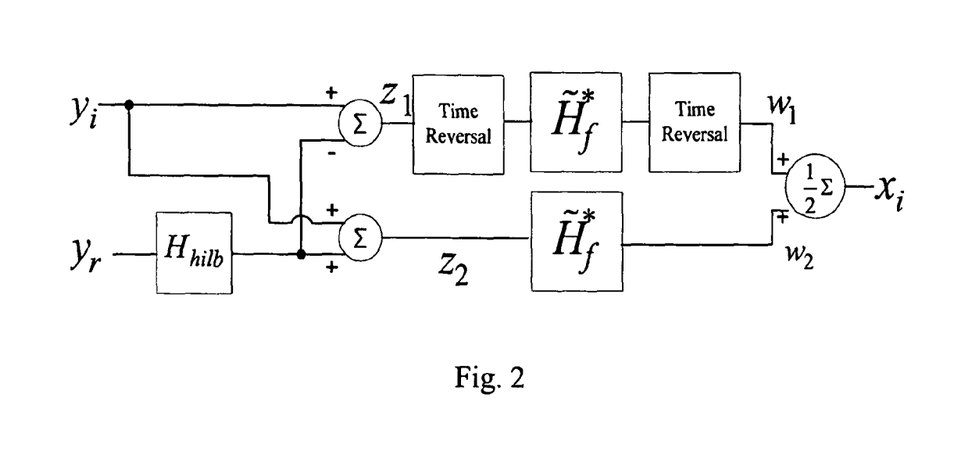
FIG. 2 is a schematic block diagram of an example of a filtering system to allow DC using the real and imaginary parts of the received signal to produce the imaginary part of a transmitted signal.

The term containing $\tilde{H}_f^*$ in Equation (6) is easily obtained since $\tilde{H}_f^*$ is stable and causal. To obtain the term containing $\tilde{H}_f$, an equivalent expression is considered: $\tilde{H}_f(Y_r + H_{hilb}Y_i) = [\tilde{H}_f^*(Y_r + H_{hilb}Y_i)^*]^*$. Noting that a complex conjugate of a signal's Fourier Transform is equivalent to a time-reversal operation, the required filtering process can be implemented using a time reversal device. The time-reversal technique was previously studied for non-causal filtering achieving linear phase response using infinite impulse response filters as described in S. R. Powell and P. M. Chau, "A technique for realizing linear phase IIR filters," IEEE Trans. On Signal Processing, vol. 39, pp. 2425-2435, November 1991. A schematic block diagram of the required filtering system which allows DC using the real and imaginary parts of the input signal Y to produce the real part of the output transmission signal $X_r$ is shown in FIG. 1. The same approach can be extended to obtain the imaginary part of the transmitted signal, $X_i$ as shown in FIG. 2. As shown in FIG. 1, the circuit includes a Hilbert transformer 110, two infinite impulse response filters 120 and 125 and two time reversal devices 130 and 135.

The NOP required for IIR filtering for both quadratures is given by $NOP_{IIR} = 2 \cdot ((N_H + 2N_I) \cdot (M+2A) + 3A)$, where $N_H$ and $N_I$ are the Hilbert transformer filter order and the DC IIR filter order, respectively. M and A designate multiplication and addition operations. For comparison, the NOP required for complex FIR DC is $NOP_{FIR} = 2 \cdot (2 \cdot N_F \cdot (M+A) - A)$, where $N_F$ is the finite impulse response filter order.

Simulation of a 10 Gbp/s binary phase-shift-keying system with D=16 ps/km/nm was implemented, and to isolate the effect of dispersion, laser linewidth and nonlinearities were not considered. IIR filtering was achieved using a 6th order IIR Hilbert-transformer and an IIR filter of appropriate order that matches the dispersion of the fiber, as obtained in Equation (5). Eye closure penalty (ECP) is defined as:

$$ECP_{[dB]} = -10 \cdot \log\left(\frac{\text{Dispersion Compensated Eye Opening}}{\text{Back to Back Eye Opening}}\right)$$

Figure 3:
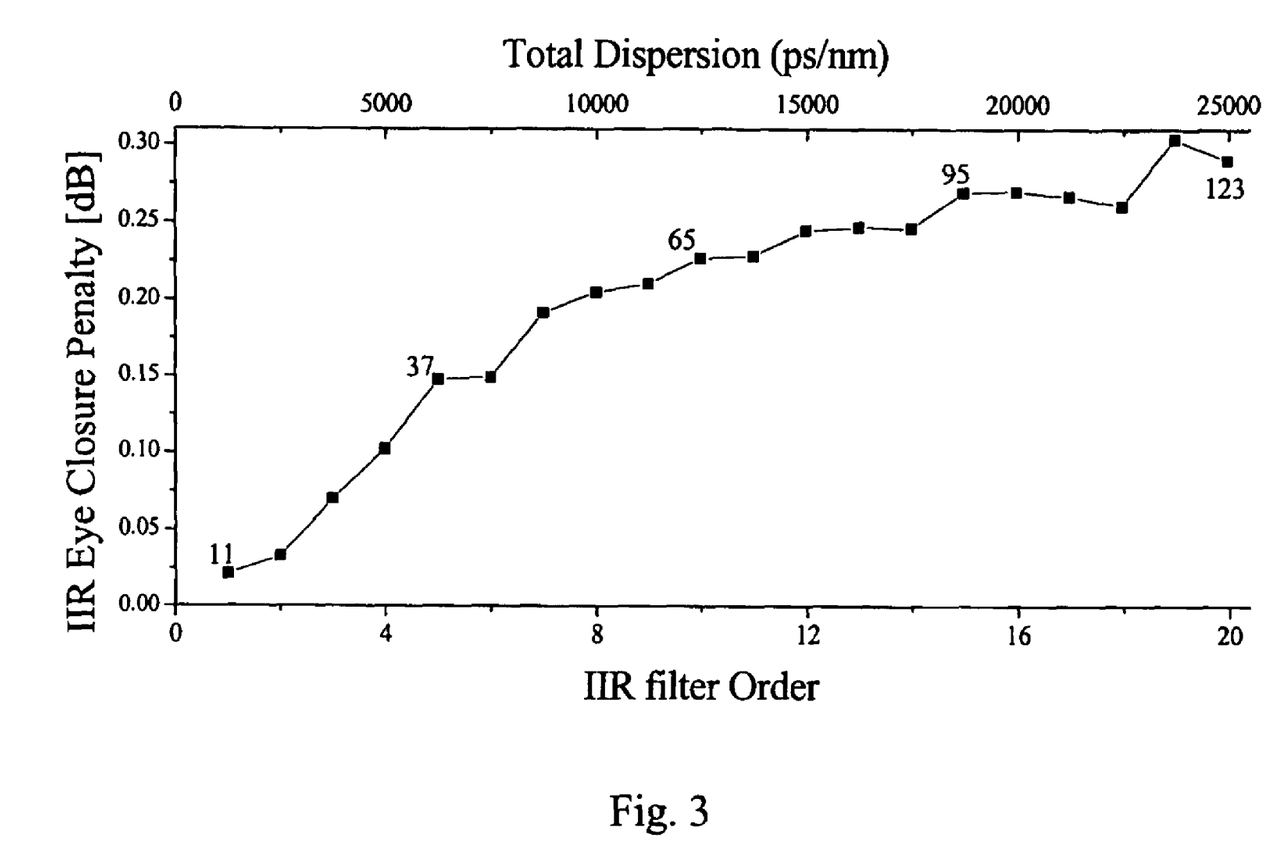
FIG. 3 is a graph showing the Eye Closure Penalty as a function of total dispersion and infinite impulse response filter order.

The eye closure penalty for the infinite impulse response filtering as a function of total dispersion and infinite impulse response filter order is shown in FIG. 3. The finite impulse response filter orders which achieve the same eye closure penalty as the infinite impulse response filter are used for selected total dispersion values. For example, eleven complex finite impulse response taps are required to achieve the same eye closure penalty as infinite impulse response filtering for the first simulated point.

For FIR filtering, roughly 5.8 complex taps were necessary for each additional 1248 ps/nm dispersion, while for the infinite impulse response filter case, 1 filter order (2 additional real taps) are required. At larger total dispersion values, the infinite impulse response filter eye closure penalty grows slightly. This may be explained by the fact that in designing the infinite impulse response filter, less degree of freedom is available compared to the finite impulse response design because of the reduced filter order.

To compare the actual benefit of IIR versus FIR DC, the number of operations in each case is considered. At large dispersion values, the overhead incurred by the Hilbert transformer in the infinite impulse response case becomes negligible and the ratio between the number of operations needed for FIR versus IIR filtering is given by $N_{FIR}$ ($2N_{IIR}$) where $N_{FIR}$ and $M_{IIR}$ are the FIR and IIR filter orders, respectively. A reduction of 2.5 times or more in the number of operations required by IIR compared to FIR is achieved starting at 15,000 ps/nm.

Figure 4:
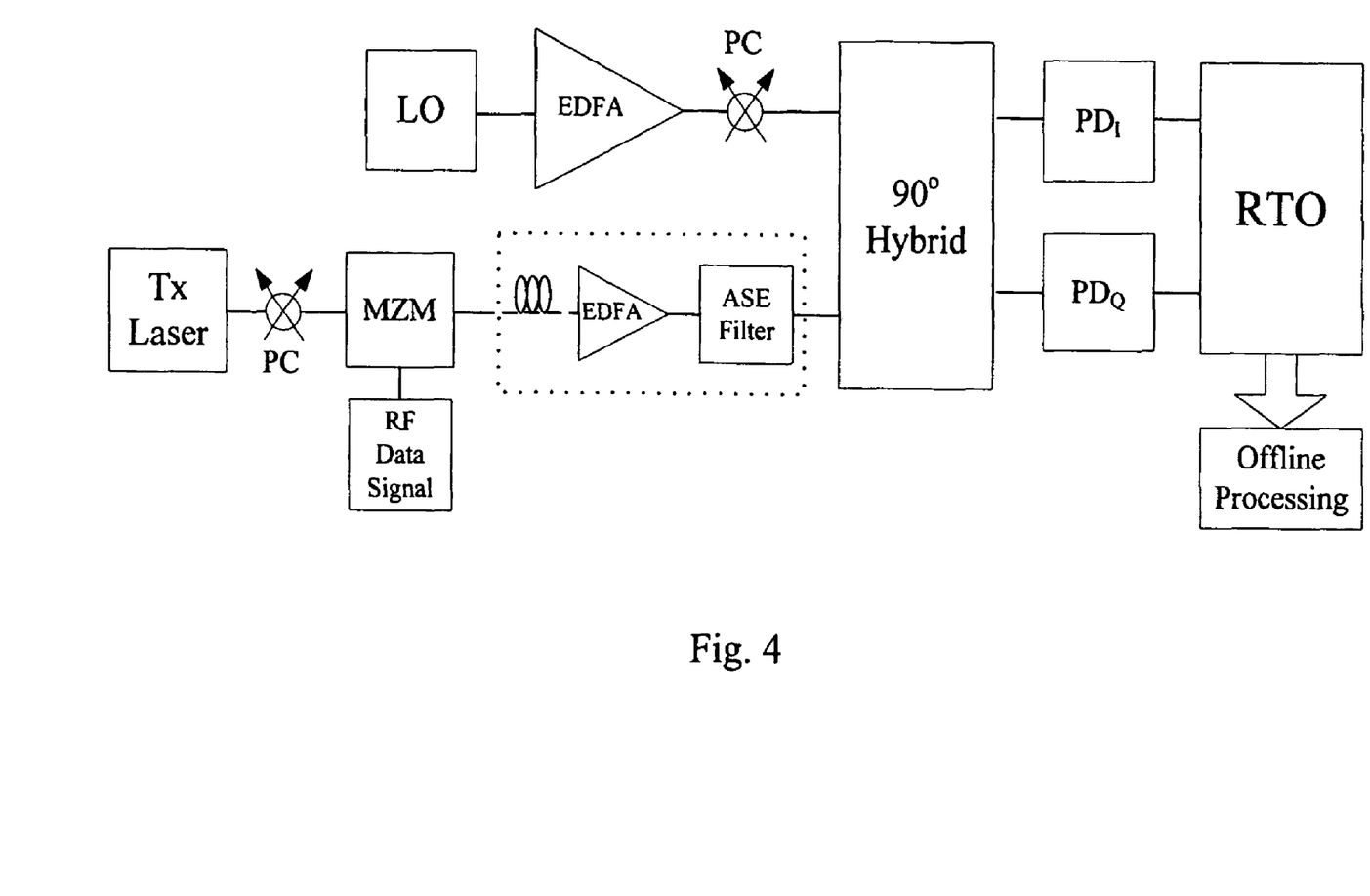
FIG. 4 is a schematic block diagram showing an example of an experimental setup for a binary phase-shift-keying transmitter/phase diversity receiver.

To verify the effectiveness of the infinite impulse response filtering technique shown in FIG. 1, a transmission experiment was conducted using the 10G bp/s binary phase-shift-keying transmission system shown in FIG. 4. A Mach-Zehnder modulator is biased at 0 transmission and driven at $2 \cdot V_\pi$, to achieve BPSK modulation. Back-to-back, approximately 80 km and approximately 160 km transmission distances were considered. The standard single-mode fiber used had dispersion parameter and attenuation coefficient of approximately 16 ps/km/nm and α=0.2 db/km, respectively. The launched optical power into each span was approximately 2.5 dBm. An optical amplifier (EDFA) with appropriate amplified spontaneous emission filter was used at each span to compensate for attenuation. The local oscillator wavelength and polarization were carefully tuned to match that of the transmitter laser. A phase diversity receiver and subsequent sampling using a 40 G samples/s real-time oscilloscope were used for detection. The samples were re-sampled to 20 G samples/s and processed offline.

Figure 5A:
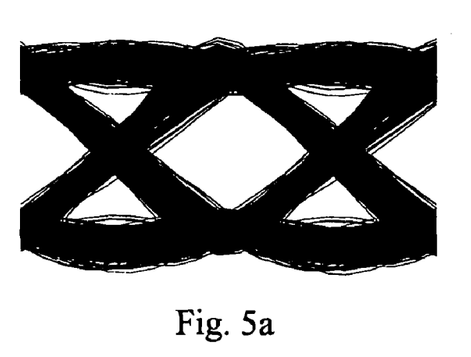
FIG. 5a shows an eye diagram for 80 km with no compensation.
Figure 5B:
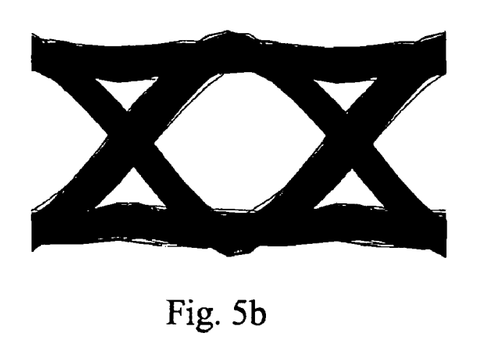
FIG. 5b shows an eye diagram for 80 km with $1^{st}$ order infinite impulse response compensation.
Figure 5C:
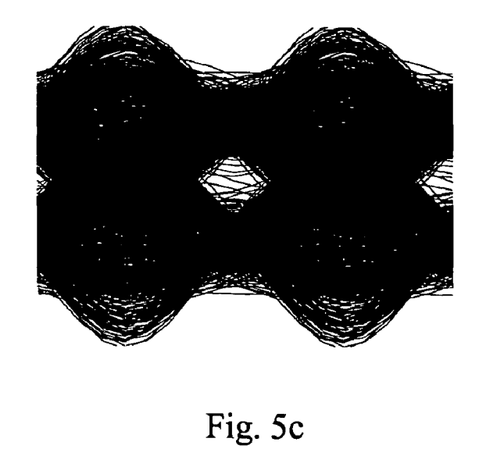
FIG. 5c shows an eye diagram for 160 km without compensation.
Figure 5D:
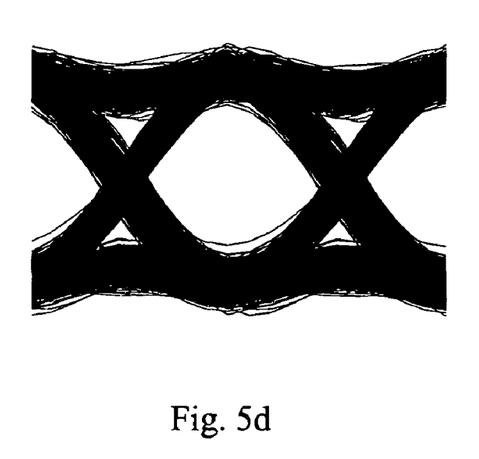
FIG. 5d shows an eye diagram for 160 km with 2nd order infinite impulse response compensation.

DC was implemented using the infinite impulse response filtering technique previously described and a 6th order IIR Hilbert-transformer. Phase estimation was achieved as described in M. G. Taylor, "Coherent detection method using DSP for demodulation of signal and subsequent equalization of propagation impairments," IEEE Photon. Technol. Lett., vol. 16, pp. 674-676, February 2004 and the best back-to-back Q-factor of approximately 17.17 was measured. DC for 80 km and 160 km was achieved using 1st and 2nd order infinite impulse response filters, respectively. The eye diagrams for 80 km and 160 km obtained using IIR filtering are shown in FIGS. 5a-5d. FIG. 5a shows an eye diagram for 80 km with no compensation, FIG. 5b shows an eye diagram for 80 km with $1^{st}$ order infinite impulse response compensation, FIG. 5c shows an eye diagram for 160 km without compensation, and FIG. 5d shows an eye diagram for 160 km with 2nd order infinite impulse response compensation.

When infinite impulse response filtering was implemented the Q-factor improved from 9 to approximately 13.44 and from 3.64 to approximately 10.16, for the 80 km and 160 km transmission distances, respectively. In the finite impulse response filtering case the resulting Q-factors after DC were 11.91 using 14 taps and 9 using 20 taps, for 80 km and 160 km transmission distances, respectively. It is concluded that an additional 80 km span requires an addition of only one order to the infinite impulse response filter, approximately two taps. In the finite impulse response case, six complex taps were necessary, which is a two-thirds reduction for the infinite impulse response filter.

The use of an iterative process to obtain the infinite impulse response filter coefficients does not guarantee perfect matching between the actual infinite impulse response filter response and the desired response, conjugate of Equation (2). This leads to a small penalty for infinite impulse response filtering compared to finite impulse response filtering with larger dispersion values although the penalty is reduced by cascading the infinite impulse response filter with a low tap-count complex finite impulse response filter to compensate for the small discrepancy between the desired and obtained infinite impulse response responses. It is important to note that this IIR approach involves time-reversal operations. The benefit from the reduced number of operations required by infinite impulse response filtering has to be weighed against the added complexity of the time reversal operation and the effect on real-time implementation through parallelization.

Figure 6:
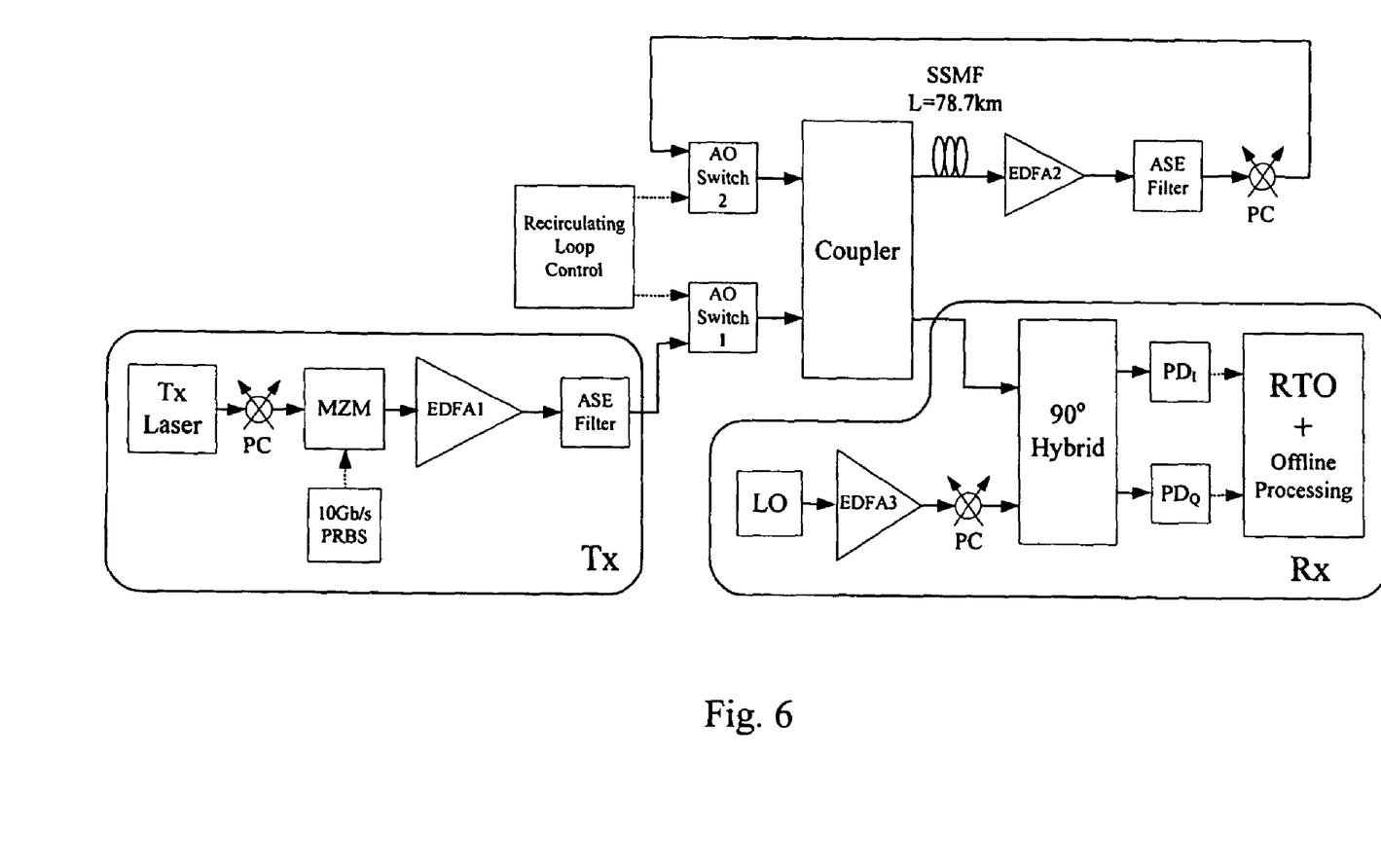
FIG. 6 is a schematic block diagram showing an example of an experimental re-circulating loop.

Verification of the infinite impulse response filtering approach was described in G. Goldfarb and G. Li, "Chromatic Dispersion Compensation Using Digital IIR Filtering With Coherent Detection," Photonics Technology Letters, IEEE, vol. 19, pp. 969-971, 2007, where experimental results were obtained up to approximately 160 km (2,560 ps/nm) of standard single-mode fiber (SSMF) transmission. This extends the total accumulated dispersion to higher values, up to approximately 25,192 ps/nm. For this experiment, a recirculating loop was constructed, as shown in FIG. 6.

A Mach-Zehnder modulator biased at zero transmission and driven at $2 \cdot V\pi$ was used to generate binary-phase-shift-keying modulation and Pseudo-random bit sequence of length of approximately $2^{23}-1$ was used. Erbium-doped fiber amplifier (EDFA1) and a subsequent amplified-spontaneous emission (ASE) filter were included to boost the signal going into the loop to a level of −2.2 dB at the SSMF input. Acousto-optic (AO) switch 1 fills the loop with the signal from the transmitter (Tx). AO switch 2 closes after the loop is filled and each recirculation loss is compensated by EDFA2 which was set to have gain of 32.1 dB. The total loop loss includes all the elements in the loop: fiber loss, ASE filter, polarization controller (PC), AO switch 2 insertion losses and the loop coupler loss. The loop includes SSMF of length 78.7 km, dispersion coefficient D=16 ps/km/nm and loss coefficient α=0.2 db/km.

A homodyne phase-diversity receiver (Rx) was implemented using a LO laser boosted by EDFA2 and a polarization controller (PC) which was used to align the polarization of the incoming signal after each span. A 90° hybrid was used to obtain the In-phase and Quadrature (I/Q) components of the transmitted signal after translation to baseband. The outputs from the 90° hybrids are detected using two photo-detectors ($PD_{I/Q}$) and sampled using an Agilent Infinium DS081204A real-time oscilloscope at 40 Gs amp/s. Subsequent offline processing includes resampling to 20 Gsamples/s, DC and demodulation. Phase estimation was achieved as described in M. G. Taylor, "Coherent detection method using DSP for demodulation of signal and subsequent equalization of propagation impairments," Photonics Technology Letters, IEEE, vol. 16, pp. 674-676, 2004.

It is sufficient to implement the analog-to-digital (A/D) conversion at 20 Gs amp/s. However, the real-time oscilloscope used has an anti-aliasing filter which is matched to 40 Gs amp/s, rate. Setting the sampling rate at 20 Gsamp/s leads to unnecessary aliasing. Resampling to the required Nyquist rate ($2 \cdot Br$) is done in the digital domain where an anti-aliasing filter is implemented within the resampling process. DC was achieved using the IIR filtering technique described in regard to FIG. 1. In this experiment, the Hilbert-transformer filter is a $6^{th}$ order infinite impulse response filter.

Approximately 25,000 samples were used to calculate the decision-threshold Q-factor obtained after phase estimation. The back-to-back Q-factor was found to be approximately 18.8. The Q-factor values as a function of total dispersion (or IIR order/number of spans, which are linearly related) are plotted in FIG. 7. For comparison, the best Q-factor obtained by FIR filtering is also plotted. For the FIR results the filter length can be arbitrarily long.

Figure 7:
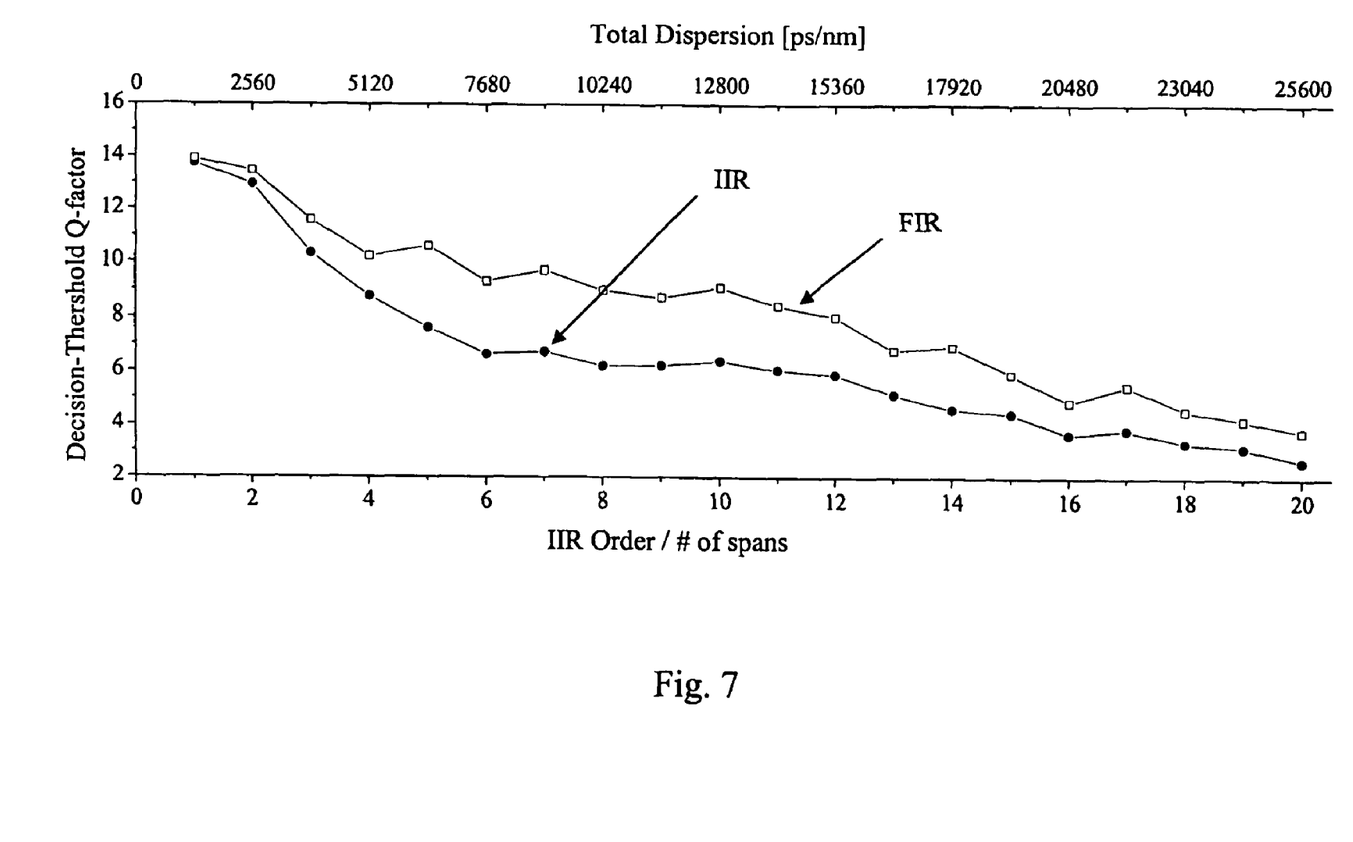
FIG. 7 is a graph showing the decision-threshold Q factor vs. total dispersion.

FIG. 7 shows that IIR filtering can be used for DC of large dispersion values. The FIR filtering slightly out-performs the IIR filtering (FIR Q-factor is on average approximately 1.5 dB higher). This may be explained by the fact that in designing the infinite impulse response filter, less degree of freedom is available compared to the finite impulse response design because of the reduced filter order.

Figure 8:
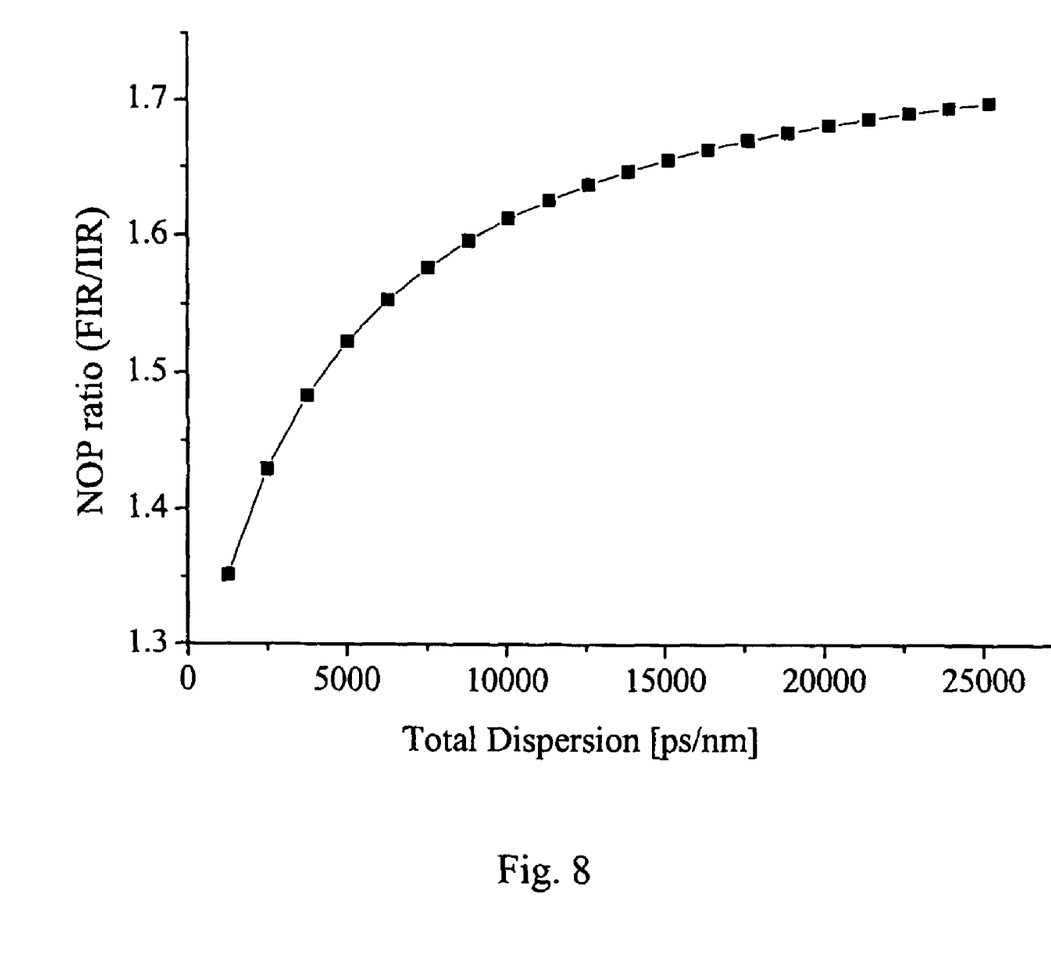
FIG. 8 is a graph showing number of operations ratio (finite impulse response/infinite impulse response) vs. total dispersion.

To compare the actual benefit of IIR versus FIR DC, the NOP in each case is considered. The FIR filter order is chosen such that a 1 dB in Q-factor penalty is allowed. This value also approximates the performance of FIR filtering with that of IIR. It is found that each span, approximately 1260 ps/$_{nm}$, requires additional 2.7 complex FIR taps. The obtained FIR filter order (per span) is used for the calculation of NOP required using $NOP_{FIR} = 2 \cdot (2 \cdot N_F \cdot (M+A) - A)$. The ratio of NOP (FIR/IIR) is shown in FIG. 8. FIR filtering requires a factor of approximately 1.7 in NOP compared to IIR. Further reduction is expected for higher dispersion values where the overhead from the Hilbert transformer is less significant.

Referring back to FIGS. 1 and 2, in a first preferred embodiment of the invention provides for infinite impulse filtering including receiving an input signal having a real part ($y_r$) and an imaginary part ($y_i$). The imaginary part is Hilbert-transformed; it is subtracted from the real part to provide an upper-branch signal and added to the real part to provide a signal to a lower branch. The upper branch signal is infinite-impulse-response filtered while the lower branch signal is time-reversed, infinite-impulse-response filtered and time-reversed again. The processed signals from the upper and lower branches are then averaged using a summation and division-by-2 device to produce the real part of the dispersion compensated signal ($x_r$). A complementary scheme obtains the imaginary part of the dispersion compensated signal ($x_i$). This complementary scheme involves Hilbert-transforming the real part of the received signal, $y_r$. The Hilbert-transformed signal is subtracted from the imaginary part of the received signal $y_i$ to produce an input to the upper branch and summed with $y_i$ to be processed in the lower branch. The signal in the upper branch is time-reversed, infinite-impulse-response filtered and time-reversed again, while the signal in the lower branch is infinite-impulse-response filtered. The processed upper and lower branches are averaged using a summation and division-by-2 operation to produce the imaginary part of the dispersion compensated signal $x_i$.

An alternative method to the method described above is the implementation of complex-infinite-impulse-response filtering. The use of such filters is described in A. Carena, V. Curri, R. Gaudino, P. Poggiolini, and S. Benedetto, "On the joint effects of fiber parametric gain and birefringence and their influence on ASE noise,"*J. Lightwave Technol.*, vol. 16, pp. 1149-1157, July 1998. This implementation relies on matching of group velocity dispersion as opposed to matching of phases for dispersion compensation. Prior work involving these filters applies to time-domain optical transmission simulation. This infinite-impulse-response filter application is suggested as an alternative to finite-impulse-response filtering. As opposed to the infinite-impulse-response filtering scheme suggested above, the following scheme does not require time-reversal operation and is hence easier to implement. It does however, introduce more penalty and hence is suggested as a complimentary technique to the one described above. Moreover, the number of operations required for this implementation is higher than the scheme suggested above for high dispersion values and is hence more likely to be beneficial at short distances.

Figure 9:
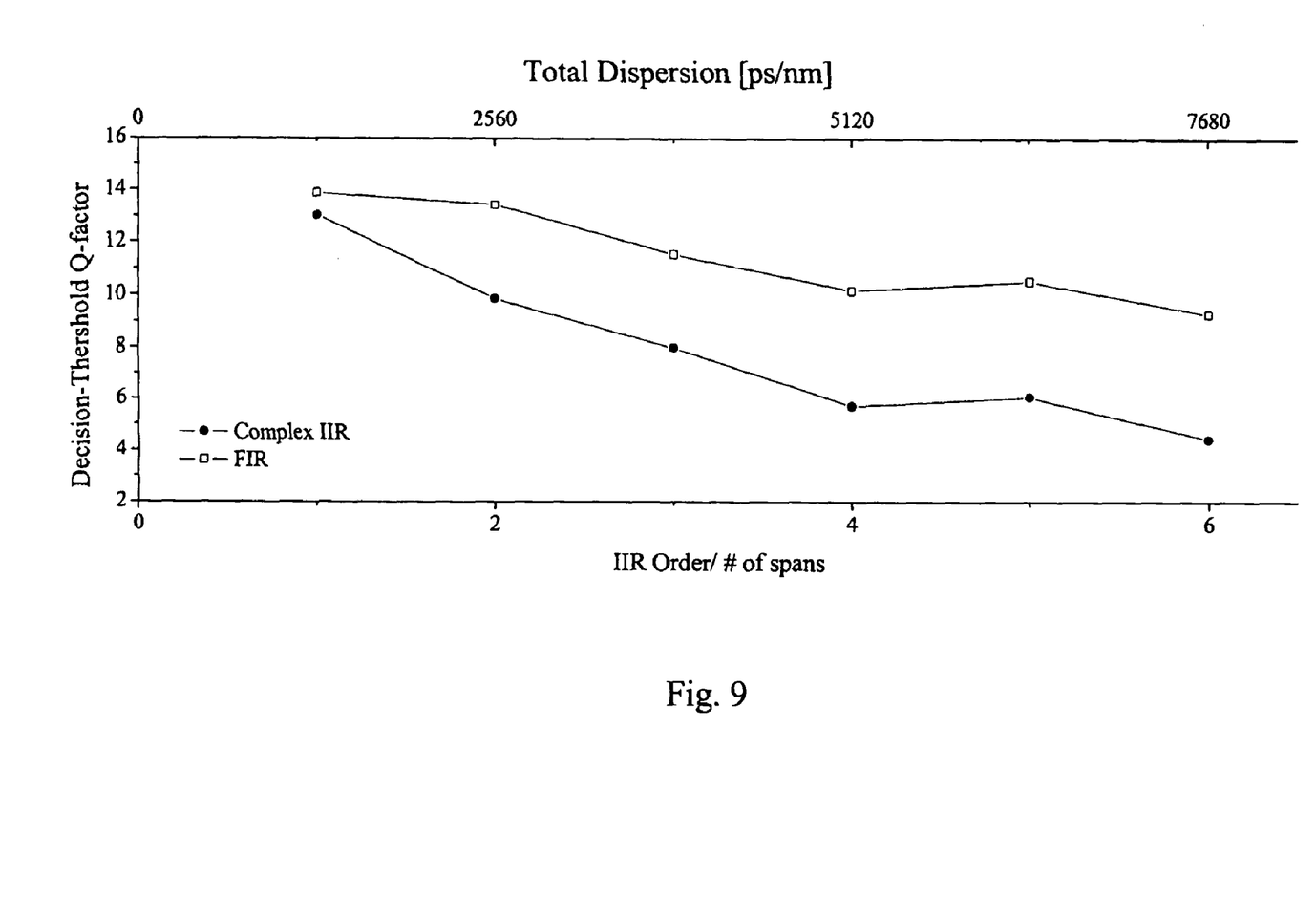
FIG. 9 is a graph showing the performance of an alternative filter configuration using the same datasets shown in FIG. 7 for the first six spans of the re-circulating loop.
Figure 10:
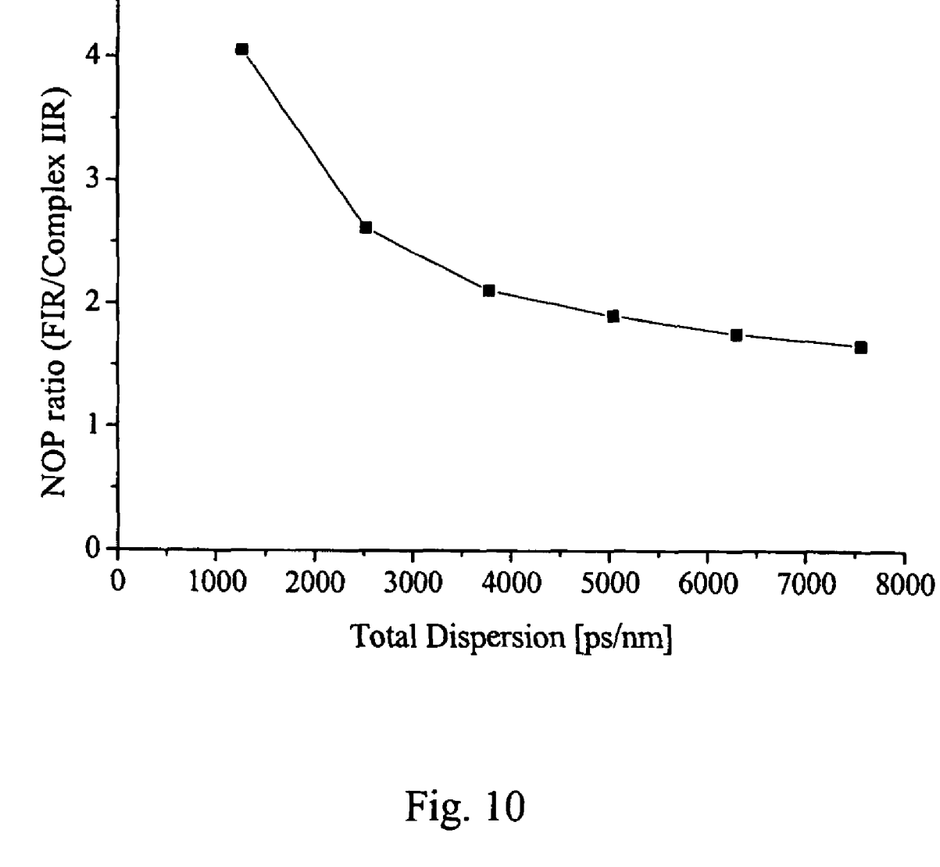
FIG. 10 is a graph showing the number of operations ratio between FIR and complex IIR filtering as a function of total dispersion/filter order for an alternative configuration.

The complex infinite-impulse-response z-domain transfer function is given by $$H(z) = u \cdot v \cdot \frac{z - j \cdot \frac{1}{u}}{z - j \cdot u} \cdot \frac{z - \frac{1}{v}}{z - v} = \frac{b_0 + b_1 \cdot z^{-1} + b_2 \cdot z^{-2}}{1 + a_1 \cdot z^{-1} + a_2 \cdot z^{-2}}$$

where u and v are the poles and 1/u and 1/v are the zeros of the filter. The filter is designed to minimize the error between the linear group delay introduced by the fiber as described by Carena et al. The infinite-impulse-response feedforward (b-coefficients) and feedback (a-coefficients) coefficients may be complex. This alternative implementation does not require time-reversal operation. The performance of this filter using the same datasets as the ones from the previously described experiment is shown in FIG. 9 and FIG. 10, for the first six spans.

The number of calculations required for dispersion compensation is given by $NOP_{COMPLEX\,IIR} = 6 \cdot N_1 \cdot (2 \cdot A + M)$ where $N_I$ is the filter order. The number of operations ratio between FIR and complex IIR filtering schemes shown in FIG. 10, as a function of total dispersion/filter order.

This alternative implementation can be used independently of the time-reversal implementation or complimentary to it for short dispersion values were the savings in number of operations is significant and the complex infinite-impulse-response performance penalty is smaller.

In summary, the method, system, apparatus and device of the present invention provides an infinite impulse response filtering approach that is used to mitigate chromatic dispersion for optical transmission systems employing a phase diversity receiver with subsequent sampling and DSP. The benefit obtained by infinite impulse response filtering is a reduction in tap count required by the infinite impulse response filter to achieve DC, which originates from the inherent feedback process in infinite impulse response filtering. This advantage becomes more significant at longer transmission distances since the overhead incurred by the Hilbert transformer is constant. A reduction factor of approximately 1.7 in the number of operation required for DC is demonstrated using infinite impulse response filtering, compared to finite impulse response filtering.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. An infinite impulse response filtering system to allow DC using a complex input signal having a real and imaginary part of the complex input signal $y_r$ and $y_i$ to produce a real part of a dispersion-compensated signal $X_r$ comprising:
a Hilbert transformer for filtering one of a real and imaginary part of the complex input signal;
a first circuit for subtracting the filtered imaginary part of $y_i$ from the real part $y_r$ and filtering a difference signal $Z_1$ to produce a filtered real signal $w_1$;
a second circuit for summing the filtered imaginary signal $y_i$ and the real part of the input signal $y_r$ and filtering and time reversing a summation $Z_2$ to produce a filtered imaginary signal $w_2$, the second circuit comprising:
a first summing device for summing the input signal $y_r$ with the filtered input signal $y_i$ from the Hilbert transformer to produce a real signal $z_2$;
a first time reversal device connected with an output of the second summing device for time reversing the signal $z_2$; this time-reversal device operates as a first-in-last-out stack where the first stored sample is the last to be fed into the subsequent infinite-impulse-response filter;
a first real-coefficients infinite impulse response filter connected with the output of the first time reversal device to filter the signal from the first time-reversal device; and
a second time reversal device connected to an output of the real-coefficients infinite impulse response filter to produce the signal $w_2$; and
a first output summing device for summing the real and the imaginary filtered signal $w_1$ and $w_2$ to produce the real part of a dispersion-compensated signal $X_r$.

2. The filtering system of claim 1, wherein the first circuit comprising:
a second summing device for subtracting the input signal $y_r$ from the filtered input signal y, from the first Hilbert transformer output to produce a real signal $z_1$; and
a second real-coefficients infinite impulse response filter for receiving and filtering signal $z_1$ to produce the real signal $w_1$.

3. The system of claim 1, further comprising:
a third circuit for summing the filtered real part of the input signal $y_r$ from the Hilbert transformer to produce a filtered imaginary signal $w_2$;
a fourth circuit for subtracting the filtered real part $Y_r$ from the imaginary part $Y_i$ and filtering and time reversing difference to produce a filtered real signal $w_1$; and
a second output summing device for summing the real and the imaginary filtered signals $w_1$ and $w_2$ to produce the imaginary part of the dispersion-compensated signal $x_i$ after dividing by 2.

4. The system of claim 3, wherein the fourth filtering circuit comprises:
a third summing device for subtracting the filtered input signal $y_r$ from the Hilbert transformer from the input signal $y_i$ to produce a real signal $z_1$;
a third time reversal device connected with an output of the third summing device for time reversing the signal $z_1$, the time-reversal device operating as a first-in-last-out stack;
a third infinite impulse response filter connected with the output of the third time reversal device to filter the signal from the third time-reversal device where a first stored sample is last to be fed into the third infinite-impulse-response filter; and
a fourth time reversal device connected to an output of the infinite impulse response filter to produce the signal $w_1$.

5. The system of claim 3, wherein the third circuit comprises:
a fourth summing device for summing the input signal $y_i$ with the filtered input signal $y_r$ from the Hilbert transformer output to produce signal $z_2$; and
a fourth real-coefficients infinite impulse response filter for receiving and filtering of signal $z_2$ to produce the real signal $w_2$.

6. The filtering system of claim 1, wherein the first infinite impulse response filter comprises:
an infinite impulse response filter having a combined number of operations, $NOP_{IIR}=2\cdot((N_H+2N_I)\cdot(M+2A)+3A)$, where $N_H$ and $N_I$ are a Hilbert transformer filter order and an IIR filter order, respectively, and M and A designate multiplication and addition operations.

7. The filtering system of claims 4, wherein the second infinite impulse response filter comprises:
an infinite impulse response filter having a combined number of operations, $NOP_{IIR}=2\cdot((N_H+2N_I)\cdot(M+2A)+3A)$, where $N_H$ and $N_I$ are a Hilbert transformer filter order and an IIR filter order, respectively, and M and A designate multiplication and addition operations.

8. The filtering system of claims 4, wherein the third infinite impulse response filter comprises:
an infinite impulse response filter having a combined number of operations, $NOP_{IIR}=2\cdot((N_H+2N_I)\cdot(M+2A)+3A)$, where $N_H$ and $N_I$ are a Hilbert transformer filter order and an IIR filter order, respectively, and M and A designate multiplication and addition operations.

9. The filtering system of claims 5, wherein the fourth infinite impulse response filter comprises:
an infinite impulse response filter having a combined number of operations, $NOP_{IIR}=2\cdot((N_H+2N_I)\cdot(M+2A)+3A)$, where $N_H$ and $N_I$ are a Hilbert transformer filter order and an IIR filter order, respectively, and M and A designate multiplication and addition operations.

10. A method for infinite impulse filtering to produce a complex dispersion compensated output signal comprising the steps of:
receiving a complex input signal having a real part $y_r$ and an imaginary part $y_i$;
filtering one of the real part $y_r$ and an imaginary part $y_i$ of the complex input signal at a Hilbert transformer,
summing the real part $y_r$ and filtered imaginary part y, to produce a signal $Z_2$; filtering the signal $Z_2$ to produce an output signal $w_1$, comprising the steps of:
time-reversing the signal $Z_2$;
filtering the time reversed $Z_2$ with a first real-coefficients infinite impulse response filter; and
time-reversing the output signal from the first real coefficient infinite impulse response filter to produce signal $w_2$;
subtracting the filtered imaginary part $y_i$ from the real part $y_r$ to produce signal $Z_1$;
filtering the difference $Z_1$ to produce an output signal $w_2$; and
summing the output signal $w_1$ and output signal $w_2$ to produce a real part of a dispersion-compensated signal $X_r$.

11. The method of claim 10 wherein the step of filtering $Z_1$ comprises the steps of:
filtering the real signal $Z_1$ with a second real-coefficients infinite impulse response filter to produce signal $w_1$.

12. The method of claim 10 wherein the step of filtering $Z_2$ comprises the steps of:
filtering $Z_2$ with a real-coefficients infinite impulse response filter to produce signal $w_2$.

13. The method of claim 10 wherein the step of filtering $Z_1$ comprises the steps of:
time-reversing the signal $Z_1$;
filtering the time reversed signal with a real-coefficients infinite impulse response filter; and
time-reversing the time reversed and filtered output signal from the real coefficient infinite impulse response filter to produce signal $w_1$.

14. A method for infinite impulse filtering to produce a complex dispersion compensated output signal comprising the steps of:
receiving a complex input signal having a real part $y_r$ and an imaginary part $y_i$;
filtering one of the real part $y_r$ and an imaginary part $y_i$ of the complex input signal at a Hilbert transformer;
summing the real part $y_r$ and filtered imaginary part $y_1$ to produce a signal $Z_2$;
filtering the signal $Z_2$ to produce an output signal ivy;
subtracting the filtered imaginary part $y_i$ from the real part $y_r$ to produce signal $Z_1$;
filtering the difference $Z_1$ to produce an output signal $w_2$, comprising the steps of:
time-reversing the signal $Z_1$;
filtering the time reversed signal with a real-coefficients infinite impulse response filter; and
time-reversing the time reversed and filtered output signal from the real coefficient infinite impulse response filter to produce signal and
summing the output signal $w_1$; and output signal $w_2$ to produce a real part of a dispersion-compensated signal $X_r$.

15. An infinite impulse response filtering system to allow DC using a complex input signal having a real and imaginary part of the complex input signal $y_r$ and $y_i$ to produce a real part of a dispersion-compensated signal $X_r$ comprising:
- a Hilbert transformer for filtering one of a real and imaginary part of the complex input signal;
- a first circuit for subtracting the filtered imaginary part of $y_i$ from the real part $y_r$ and filtering the difference signal $Z_1$ to produce a filtered real signal $w_1$, the first circuit comprising:
  - a second summing device for subtracting the input signal $y_r$ from the filtered input signal $y_r$ from the first Hilbert transformer output to produce a real signal $z_1$; and
  - a second real-coefficients infinite impulse response filter for receiving and filtering signal $z_1$ to produce the real signal $w_1$;
- a second circuit for summing the filtered imaginary signal $y_i$ and the real part of the input signal $y_r$ and filtering and time reversing the summation $Z_2$ to produce a filtered imaginary signal $w_2$; and
- a first output summing device for summing the real and the imaginary filtered signal $w_1$ and $w_2$ to produce the real part of a dispersion-compensated signal $X_r$.

16. The system of claim 15, wherein the second circuit comprising:
- a first summing device for summing the input signal $y_r$ with the filtered input signal $y_i$ from the Hilbert transformer to produce a real signal $z_2$;
- a first time reversal device connected with an output of the second summing device for time reversing the signal $z_2$; this time-reversal device operates as a first-in-last-out stack where the first stored sample is the last to be fed into the subsequent infinite-impulse-response filter;
- a first real-coefficients infinite impulse response filter connected with the output of the first time reversal device to filter the signal from the first time-reversal device; and
- a second time reversal device connected to an output of the real-coefficients infinite impulse response filter to produce the signal $w_2$.

17. The system of claim 14, further comprising:
- a third circuit for summing the filtered real part of the input signal $y_r$ from the Hilbert transformer to produce a filtered imaginary signal $w_2$;
- a fourth circuit for subtracting the filtered real part $Y_r$ from the imaginary part $Y_i$ and filtering and time reversing difference to produce a filtered real signal $w_1$; and
- a second output summing device for summing the real and the imaginary filtered signals $w_1$ and $w_2$ to produce the imaginary part of the dispersion-compensated signal $x_i$ after dividing by 2.

18. The system of claim 17, wherein the fourth filtering circuit comprises:
- a third summing device for subtracting the filtered input signal $y_r$ from the Hilbert transformer from the input signal $y_i$ to produce a real signal $z_1$;
- a third time reversal device connected with an output of the third summing device for time reversing the signal $z_1$, the time-reversal device operating as a first-in-last-out stack;
- a third infinite impulse response filter connected with the output of the third time reversal device to filter the signal from the third time-reversal device where a first stored sample is last to be fed into the third infinite-impulse-response filter; and
- a fourth time reversal device connected to an output of the infinite impulse response filter to produce the signal $w_1$.

19. The system of claim 17, wherein the third circuit comprises:
- a fourth summing device for summing the input signal, y, with the filtered input signal $y_r$ from the Hilbert transformer output to produce signal $z_2$; and
- a fourth real-coefficients infinite impulse response filter for receiving and filtering of signal $z_2$ to produce the real signal $w_2$.

20. The filtering system of claims 16, wherein the first infinite impulse response filter comprises:
- an infinite impulse response filter having a combined number of operations, $NOP_{IIR}=2\cdot((N_H+2N_I)\cdot(M+2A)+3A)$, where $N_H$ and $N_I$ are a Hilbert transformer filter order and an IIR filter order, respectively, and M and A designate multiplication and addition operations.

21. The filtering system of claims 18, wherein the third infinite impulse response filter comprises:
- an infinite impulse response filter having a combined number of operations, $NOP_{IIR}=2\cdot((N_H+2N_I)\cdot(M+2A)+3A)$, where $N_H$ and $N_I$ are a Hilbert transformer filter order and an IIR filter order, respectively, and M and A designate multiplication and addition operations.

22. The filtering system of claims 19, wherein the fourth infinite impulse response filter comprises:
- an infinite impulse response filter having a combined number of operations, $NOP_{IIR}=2\cdot((N_H+2N_I)\cdot(M+2A)+3A)$, where $N_H$ and $N_I$ are a Hilbert transformer filter order and an IIR filter order, respectively, and M and A designate multiplication and addition operations.

23. A method for infinite impulse filtering to produce a complex dispersion compensated output signal comprising the steps of:
- receiving a complex input signal having a real part $y_r$ and an imaginary part $y_i$;
- filtering one of the real part $y_r$ and an imaginary part $y_i$ of the complex input signal at a Hilbert transformer;
- summing the real part $y_r$ and filtered imaginary part $y_i$ to produce a signal $Z_2$;
- filtering the signal $Z_2$ to produce an output signal $w_1$;
- subtracting the filtered imaginary part y, from the real part $y_r$ to produce signal $Z_1$;
- filtering the difference $Z_1$ to produce an output signal $w_2$, the filtering $Z_1$ step comprises the steps of:
  - time-reversing the signal $Z_1$;
  - filtering the time reversed signal with a real-coefficients infinite impulse response filter; and
  - time-reversing the time reversed and filtered output signal from the real coefficient infinite impulse response filter to produce signal $w_1$; and
- summing the output signal $w_1$ and output signal $w_2$ to produce a real part of a dispersion-compensated signal $X_r$.

* * * * *